US007996720B2

(12) United States Patent  
Jung et al.

(10) Patent No.: US 7,996,720 B2
(45) Date of Patent: Aug. 9, 2011

(54) APPARATUS AND METHOD OF MIRRORING FIRMWARE AND DATA OF EMBEDDED SYSTEM

(75) Inventors: Jisung Jung, Daejeon (KR); Jaemyoung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 399 days.

(21) Appl. No.: 12/198,832

(22) Filed: Aug. 26, 2008

(65) Prior Publication Data

US 2009/0150598 A1 Jun. 11, 2009

(30) Foreign Application Priority Data

Dec. 10, 2007 (KR) .................. 10-2007-0127705

(51) Int. Cl.
*G06F 11/00* (2006.01)
(52) U.S. Cl. ...................................................... 714/36
(58) Field of Classification Search .................. None
See application file for complete search history.

(56) References Cited

U.S. PATENT DOCUMENTS

| 5,432,927 A * | 7/1995 | Grote et al. ..................... 713/2 |
| 5,615,225 A * | 3/1997 | Foster et al. ................. 379/29.01 |
| 2003/0208654 A1 * | 11/2003 | Krontz et al. ................. 710/312 |
| 2006/0288177 A1 | 12/2006 | Shaw |
| 2007/0234332 A1 * | 10/2007 | Brundridge et al. .......... 717/168 |
| 2008/0209261 A1 * | 8/2008 | Zhang et al. ..................... 714/6 |

FOREIGN PATENT DOCUMENTS

| KR | 1020030062793 A | 7/2003 |
| KR | 1020060059040 A | 6/2006 |
| KR | 1020070034197 A | 3/2007 |

* cited by examiner

*Primary Examiner* — Gabriel L Chu

(57) ABSTRACT

Disclosed is an apparatus and method of mirroring firmware and data of an embedded system. The embedded system mirrors a boot loader image, a kernel image, a RAM disk image and data that are stored on a main flash memory to be operated onto a secondary flash memory. Therefore, when a main flash memory does not normally work, the firmware and data that are stored on the main flash memory to be operated is mirrored onto the secondary flash memory, which prevents the loss of data and maintains the operation of the embedded system. As a result, it is possible to secure the reliability and operability of the system.

13 Claims, 3 Drawing Sheets

APPARATUS AND METHOD OF MIRRORING FIRMWARE AND DATA OF EMBEDDED SYSTEM

BACKGROUND OF THE INVENTION

1. Field of the Invention

The present invention relates to an apparatus and a method of mirroring firmware and data, and in particular, to an apparatus and a method of mirroring firmware and data for an embedded system that mirrors firmware and data stored on a main flash memory of the embedded system to be operated on a secondary flash memory and when the main flash memory is damaged, the mirrored secondary flash memory is used instead of the damaged main flash memory to prevent the loss of data and stably maintain the system operation.

This work was supported by the IT R&D program of MIC/IITA [2006-S-038-02, Development of Device-Adaptive Embedded Operating System for Mobile Convergence Computing].

2. Description of the Related Art

An embedded system refers to a control system that has a processor built therein to manipulate the device in order to perform a predetermined specific function and is used to control the functions of various electronics, electric home appliances, and mechanical apparatuses. The embedded system includes a main control unit (MCU) and programs that are loaded therein so as to perform a specific function by operating the MCU. The embedded system has a basic computing ability that becomes compatible for the purpose of an apparatus and uses an application suitable for the purpose thereof to perform the control operation. The embedded system uses a small sized memory, which minimizes the size of the hardware while reducing the cost and optimizing the performance. Generally, the embedded system uses an embedded Linux as an operating system (OS). However, the embedded system does not use a high capacity hard disk in order to store the OS and programs, but manages the programs and resources through a memory apparatus.

A basic structure of an embedded system according to the related art is configured by a boot ROM, a flash memory, an SDRAM, a network device, and other devices in addition to a CPU. The boot RROM is a nonvolatile memory and stores a boot loader that is a start code of a system. The SDRAM (Synchronous Dynamic RAM) is a volatile memory and manages the application and the resources. The flash memory is a nonvolatile memory and manages the data backup.

FIG. 1 is a diagram illustrating the data backup of an embedded system according to the related art.

A backup method of an embedded system according to the related art includes: allocating a flash disk space for storing back-up data to a flash memory where an OS image storage and an RAM disk image storage are allocated thereto; formatting data of the flash disk; registering a file system for managing files and folders, which are stored on the flash disk, as a kernel of the OS; and storing back-up data on the flash disk as units of blocks.

The registering of a file system in the flash disk mounts JFFS2 (Journaling flash file system version 2) onto the flash disk.

The storing of backup data on the flash disk as units of blocks accesses to the flash disk as units of blocks using an MTD (Memory Technology Devices). This method further includes: converting the backup data stored on the flash disk into one backup file; uploading the backup file onto a memory of an external apparatus connected through a LAN (Local Area Network) using an FTP (File Transfer Protocol) method; and downloading and storing the backup file from the external apparatus connected through the LAN when rebooting the system.

As shown in FIG. 1, a flash disk 38 for storing the backup data is allocated into a storage of a flash memory on which a kernel 34 and a RAM disk 36 are stored and accessed as units of blocks to transmit and read out the data. In the case of total 16 Mbytes of flash memory, the flash memory for the embedded system divides 2 Mbytes into 1 Mbyte of first kernel 34 and 1 Mbyte of second kernel, and 10 Mbytes into 5 Mbytes of first RAM disk 36 and 5 Mbyte of second RAM disk, respectively. Further, 4M bytes of storage space is allocated as a data backup storage to be used as a flash disk 38.

The space that is allocated as a data backup space for the flash disk 38 is accessed using the MTD (Memory Technology Devices) which is used to access a block device. Therefore, it is possible to use the flash memory as a hard disk. In this case, the backup data that is stored on the flash disk 38 is managed using a JFFS2 (Journaling flash file system version 2) file system as a file and a directory structure. Accordingly, a file can be stored and readout from the flash disk 38 in the unit of sector, which simplifies the memory management.

On the RAM disk 36 of the flash memory, a RAM disk image is stored. The RAM disk image is a file that is designed to have an EXT2 format and any necessary files are put on the RAM disk, and then the contents of the RAM disk are copied as a file format. When a location of a content of the file is designated, a Linux kernel 34 transfers the corresponding content onto the RAM disk 36 while booting. In this case, it is assumed that the RAM disk image is compressed in the kernel 34. The boot loader BOOT copies the compressed RAM disk image into a SDRAM 32, and indicates the location of the image data to the kernel 34 before booting. Thereby, the kernel 34 uses the RAM disk image as a route after booting.

With this structure, in order to secure the flash disk 38 for data backup, the embedded system allocates a memory space for data backup in the entire flask memory in consideration of the reasonable size of the kernel (OS image storage) 34 and the RAM disk (RAM disk image storage) 36. Accordingly, 4 Mbytes space for the flash disk 38 is secured, and the space is formatted. Thereafter, the embedded system performs a mounting process that registers in a system kernel in order to provide as a pass available for the Linux kernel 34 and applications to registers a file system (for example, JFFS2) in the kernel, which embodies the flash disk 38 on the flash memory.

Generally, when the embedded system is turned on, the start code of the booting ROM is executed to initialize the CPU, a memory manager, and on-chip devices and configure a memory map. Thereafter, the boot loader is executed. In the flash memory, a Linux kernel image and an RAM disk image are mounted so as to operate the embedded Linux OS by the boot loader. The kernel image and the RAM disk image mounted in the flash memory are copied and extracted onto the SDRAM through the boot manager BOOTM. After performing the boot loader, the embedded system executes the extracted kernel, recognizes the extracted RAM disk and mounts them.

However, the embedded system according to the related art has complex processes and requires a large amount of time to protect the firmware and data. Further, the embedded system has a drawback in the response ability when irregularity occurs in the embedded system. Therefore, the embedded system according to the related art does not provide a method of protecting the boot loader, the firmware including the kernel image and the RAM disk image, and the data and normally driving the system when the main flash memory is damaged.

SUMMARY OF THE INVENTION

This invention has been finalized in view of the drawbacks. An object of the invention is to provide an apparatus and method of mirroring firmware and data of an embedded system that operates firmware and data that have been mirrored onto a secondary flash memory in advance when the main flash memory of the embedded system is damaged, and promptly responds to any abnormal conditions of the memory of the system to increase the reliability and operability of the embedded system and protect information of the embedded system.

Objects and other advantageous of the invention will be understood through the following description and will be apparently cleared by the exemplary embodiments of the invention. Further, it can be understood that the objects and the embodiments will be embodied by the means described in the claims and the compositions thereof.

According to an exemplary embodiment of the invention, an apparatus of mirroring firmware and data of an embedded system includes: a main memory that includes storages for a boot loader, a kernel image, an RAM disk image, and data, and receives the boot loader, a kernel image, a RAM disk image, and data to be stored on corresponding storages; a secondary memory that includes storages for the boot loader, the kernel image, the RAM disk image, and the data; and a memory manager that mirrors the boot loader, the kernel image, the RAM disk image, and data stored on the main memory into the secondary memory.

The secondary memory may have at least the same capacity as the main flash memory.

When the embedded system is turned on, if the main memory is abnormal, the secondary memory may receive the boot loader from a boot ROM to store the boot loader on the corresponding storage.

The apparatus may further include a network device that stores the boot loader, the kernel image, the RAM disk image, and the data mirrored onto the secondary memory on an external storage device.

When the embedded system is turned on, the boot loader of a boot ROM may be copied onto a space for a boot loader of the main memory, and the boot loader may be executed so that the kernel image and the RAM disk image is stored on the main memory through TFTP (Trivial File Transfer Protocol).

When the main memory is abnormal, the boot loader, the kernel image, the RAM disk image, and data that are mirrored onto the secondary memory may be used.

A separate memory where the kernel image and the RAM disk image mounted in the main memory and the secondary memory are copied and extracted may be further included.

The separate memory may be configured by a volatile memory and the main memory and the secondary memory may be configured by nonvolatile memories.

According to another embodiment of the invention, a method of mirroring firmware and data of an embedded system includes: copying a boot loader onto a main memory by executing a boot code of the boot ROM when the embedded system is turned on; storing a kernel image, a RAM disk image, and data on the main memory by executing the boot loader; and mirroring the boot loader, the kernel image, the RAM disk image, and data stored on the main memory onto a secondary memory using a memory manager.

The method may further include copying the boot loader of the boot ROM in the secondary memory when the embedded system is turned on, and if the main memory is abnormal.

The method may further include storing the kernel image and the RAM disk image stored on the secondary memory on a kernel space and an RAM disk space of a separate memory from the main memory and the secondary memory to extract an compressed image when the embedded system is turned and if the main memory is abnormal.

The method may further include using the boot loader, the kernel image, the RAM disk image, and data mirrored onto the secondary memory when the main memory is abnormal.

The method may further include storing the mirrored boot loader, the kernel image, the RAM disk image, and the data of the secondary memory on an external storage device connected through a wire/wireless network.

According to the exemplary embodiments of the invention, by mirroring the firmware and data that are necessary for basic OS system of the embedded system onto a secondary flash memory, even when the main flash memory is abnormal, the mirrored secondary flash memory can be used. Therefore, the firmware and data can be protected, and the user can visually check the status of the system, thereby improve the reliability and operability of the embedded system.

DESCRIPTION OF THE PREFERRED EMBODIMENTS

Hereinafter, exemplary embodiments of the invention will be described in detail with reference to the accompanying drawings.

Figure 1:
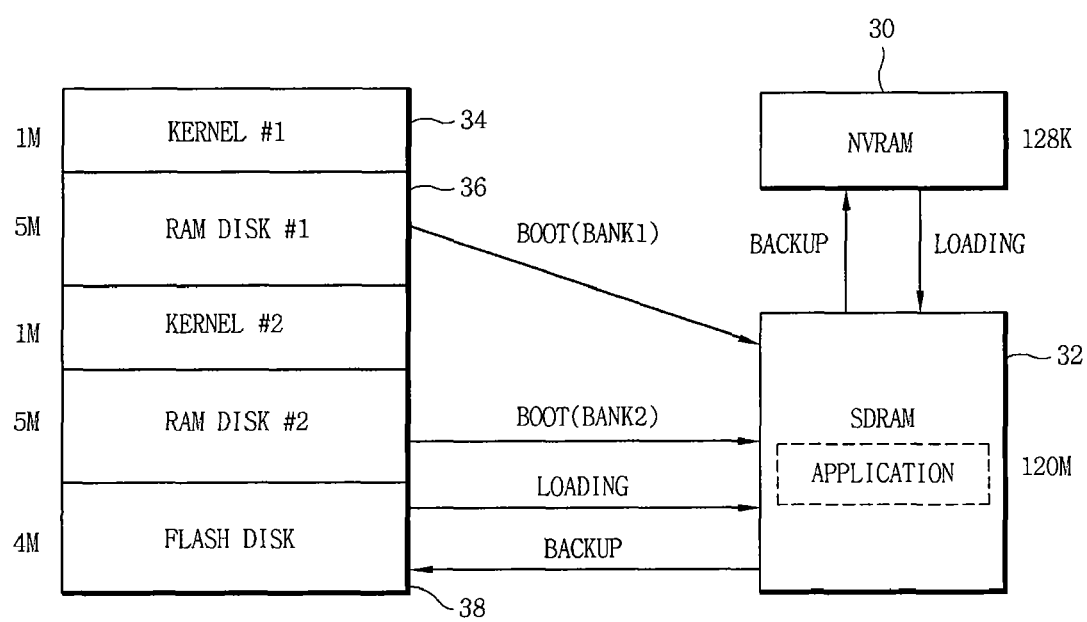
FIG. 1 is a diagram showing the management status of a backup memory of an embedded system according to the related art.
Figure 2:
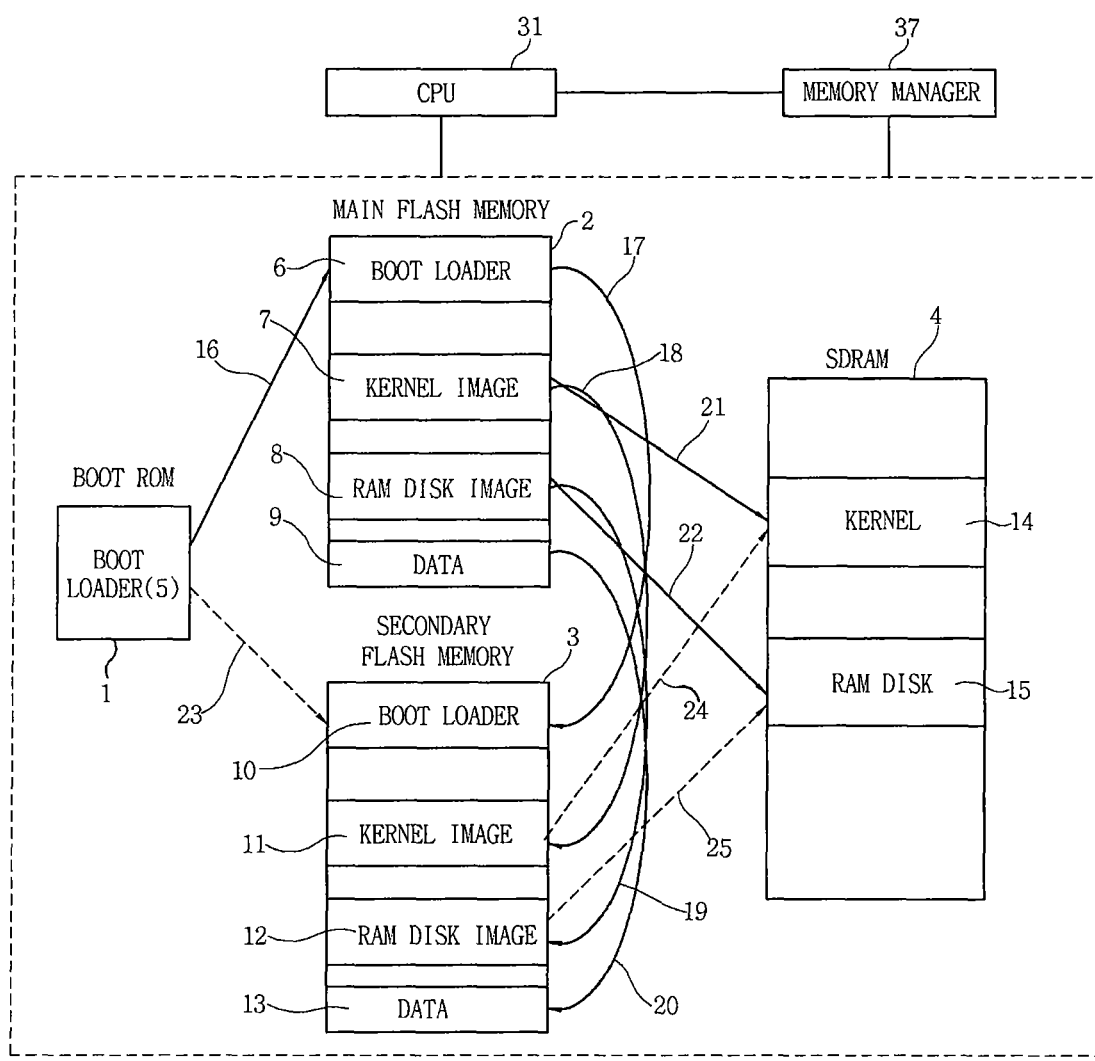
FIG. 2 is a construction diagram showing an apparatus of mirroring firmware and data of an embedded system according to an embodiment of the invention.

FIG. 2 is a construction diagram showing an apparatus of mirroring firmware and data of an embedded system according to an embodiment of the invention.

The embedded system includes a central processing unit (CPU) 31, a boot ROM 1, a main flash memory 2, a secondary flash memory 3, an SDRAM 4, a memory manager 37, and a network device (not shown).

The CPU 31 totally controls individual parts of the embedded system.

The boot ROM 1 is a nonvolatile memory. The boot ROM 1 has an image of the boot loader 5 including a boot code that represents the start of the embedded system.

The main flash memory 2 is a nonvolatile memory. The main flash memory 2 includes storages for a boot loader 6, a kernel image 7, an RAM disk image 8, and data 9. The main flash memory 2 is connected to the boot ROM 1 and the SDRAM 4. The main flash memory 2 receives a boot loader from the boot ROM 1 and stores it.

The secondary flash memory 3 is a nonvolatile memory, and has at least the same capacity as the main flash memory 2. The secondary flash memory 3 is connected to the boot ROM 1 to receive a boot loader from the boot ROM 1 and store it. The secondary flash memory 3 includes storages for a boot loader 10, a kernel image 11, an RAM disk image 12, and data 13. The firmware and data of the main flash memory 2 is mirrored in real-time onto the secondary flash memory 3. The main flash memory 2 is understood as the main memory described in claims, the secondary flash memory 3 is a secondary memory described in claims, and the SDRAM 4 is understood as a separate memory from the main flash memory 2 and the secondary flash memory 3.

The memory manager 37 mirrors in real-time firmware (a boot loader, a kernel image, and an RAM disk image) and data of the main flash memory 2 to the secondary flash memory 3. The mirrored secondary flash memory 3 is connected to the boot ROM 1 and the SDRAM 4 to be changed into a secondary flash memory operating status when the main flash memory 2 is abnormal.

The network device is used to connect the embedded system to any one of wire or wireless networks such as LAN, WLAN, and WPAN (Bluetooth, ZigBee, UWB).

When the embedded system is turned on, the boot loader 5 of the boot ROM 1 is copied to a space for the boot loader 6 of the main flash memory 2 (16). The boot loader 5 is executed to store the kernel image and the RAM disk image that is stored on a host PC (not shown) in the main flash memory through a TFTP (Trivial File Transfer Protocol). Thereby, the boot loader 6, the kernel image 7, the RAM disk image 8, and the data that are stored on the main flash memory 2 are mirrored by the memory manager 37 to be uniformly copied and stored on the corresponding spaces of the secondary flash memory 3 (17, 18, 19, 20).

The mirroring condition is that the main flash memory 2 has at least the same memory capacity as the secondary flash memory 3. The firmware and data are stored on spaces of the secondary flash memory that correspond to the spaces of the main flash memory where the firmware and data are allocated thereinto. In other word, the memory capacity of the secondary flash memory 3 is equal to or larger than the memory capacity of the main flash memory 2. Further, the data 9 from the space for the data of the main flash memory 2 is copied to the corresponding data space of the secondary flash memory 3.

Since the kernel image and the RAM image of the main flash memory 2 is compressed in an image format, the kernel image and the RAM image are stored on the corresponding spaces 14 and 15 of the SDRAM and then extracted therein (21, 22). The RAM disk image is stored on the RAM disk space of the flash memory. The RAM disk image is saved as a file having an EXT2 format on a RAM disk, and all necessary files are put on the RAM disk, and then the contents of the RAM disk are copied as a file format. When a location of the content of the file is designated, the kernel transfers the corresponding content into the RAM disk while booting. In this case, it is assumed that the RAM disk image is compressed in the kernel. Further, the boot loader copies the compressed RAM disk image onto the SDRAM 4, and indicates the location of the image data to the kernel before booting. In this case, the kernel uses the RAM disk image as a route after booting.

If the main flash memory 2 is abnormal when the embedded system is turned on, the boot loader 5 of the boot ROM 1 is copied onto the secondary flash memory 3 (23).

When the main flash memory 2 is abnormal, the kernel 14 and the RAM disk 15 of the SDRAM 4 call the kernel image and the RAM disk image from the secondary flash memory 3 to extract them (24, 25). After the kernel image and the RAM disk image are extracted, the embedded system executes the kernel, recognizes the extracted RAM disk, and then mounts them into the file system.

Figure 3:
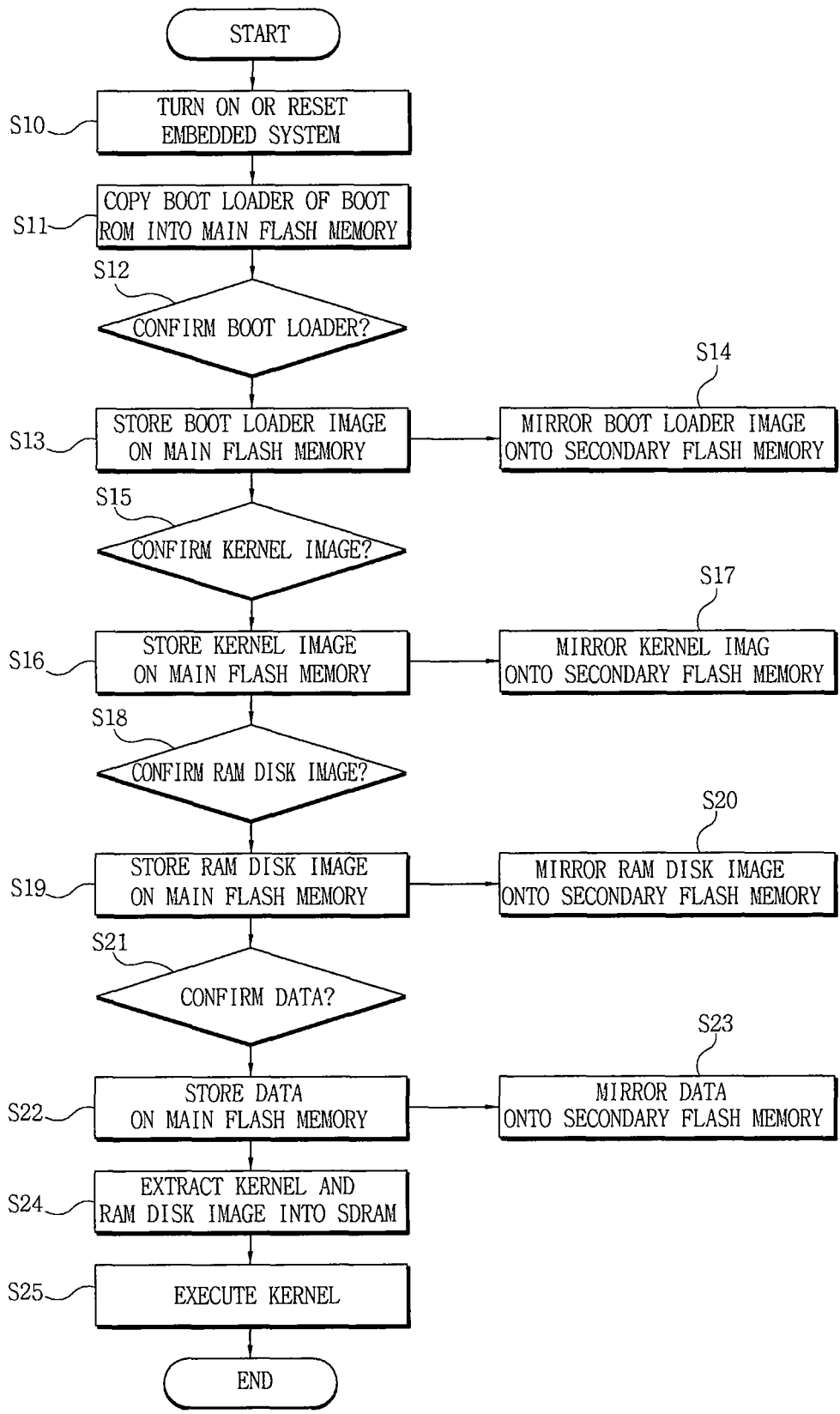
FIG. 3 is a flow chart showing a method of mirroring firmware and data of an embedded system according to another embodiment of the invention.

FIG. 3 is a flow chart showing a method of mirroring firmware and data of an embedded system according to another embodiment of the invention.

The method of mirroring firmware and data of the embedded system according to the embodiment of the invention includes: turning on or resetting the embedded system; copying the boot loader in a main flash memory by executing a boot code of a boot ROM; storing the boot loader image, the kernel image, the RAM disk image, and data in spaces of the main flash memory and mirroring and storing the kernel image, the RAM disk image, and data into a secondary flash memory using a memory manager; and copying the kernel and RAM disk images mounted in the main and secondary flash memories onto a corresponding space of the SDRAM by a boot manager for extraction, and executing the kernel by executing the extracted kernel and recognizing the extracted RAM disk after executing the boot loader to execute the kernel; and when the embedded system is turned on and the main flash memory is abnormal, copying the boot loader of the boot ROM onto the secondary flash memory, storing the kernel image and the RAM disk image of the secondary flash memory in the kernel space and the RAM disk space of the SDRAM to extract the compressed images, recognizing the extracted RAM disk to mount in the file system and executing the kernel.

Referring to FIG. 3, when the embedded system is turned on or reset (step S10), the boot code of the boot ROM 1 is executed such that the boot loader 2 is copied onto a space for the boot loader of the main flash memory 2 (step S11). Further, the boot loader 5 is executed to store the kernel image and the RAM disk image stored in the host PC (not shown) in the main flash memory 2 through the TFTP.

Thereafter, the memory manager 37 confirms the boot loader image 6, the kernel image 7, the RAM disk image 8, and data of the main flash memory 2 to mirror them onto the secondary flash memory 3.

That is, the memory manager 37 confirms the boot loader of the main flash memory 2 (step S12), stores the boot loader image onto the main flash memory 2 (step S13), and mirrors the boot loader image onto the secondary flash memory 3 (step S14).

The memory manager 37 confirms the kernel image of the main flash memory 7 (step S15), stores the kernel image onto the main flash memory (step S16), and mirrors the kernel image onto the secondary flash memory 3 (step S17).

The memory manager 37 confirms the RAM disk image of the main flash memory 2 (step S18), stores the RAM disk image onto the main flash memory 2 (step S19), and mirrors the RAM disk image onto the secondary flash memory 3 (step S20).

The memory manager 37 confirms the data in the space for data of the main flash memory 2 (step S21), stores the data on the main flash memory 2 (step S22), and mirrors the data onto the secondary flash memory 3 (step S23).

Thereafter, the kernel image and the RAM disk image mounted in the main or secondary flash memory 2 or 3 are copied onto the corresponding kernel space and RAM disk space of the SDRAM 4 through the boot manager BOOTM to be extracted (step S24). After executing the boot loader, the extracted kernel is execute and the extracted RAM disk is recognized to be mounted, thereby executing the kernel (step S25).

Here, the memory manager 37 uses an MTD (Memory Technology Devices) to access the flash memory. The MTD is also used in the mirrored secondary flash memory 3. The firmware and data of the mirrored secondary flash memory 3 may be stored on an external storage device connected thereto through LAN (Local Area Network), WLAN, WPAN, and so on.

Although the present invention has been described in connection with the exemplary embodiments of the present invention, it will be apparent to those skilled in the art that various modifications and changes may be made thereto without departing from the scope and spirit of the present invention.

What is claimed is:

1. An apparatus for mirroring firmware and data of an embedded system, comprising:
   a main memory that includes storages for a boot loader, a kernel image, a RAM disk image, and data, and receives the boot loader, the kernel image, the RAM disk image, and the data to be stored on corresponding storages;
   a secondary memory that includes storages for the boot loader, the kernel image, the RAM disk image, and the data; and
   a memory manager that mirrors the boot loader, the kernel image, the RAM disk image, and the data stored on the main memory into the secondary memory,
   wherein when the embedded system is turned on, if the main memory is abnormal, the secondary memory receives the boot loader from a boot ROM to store the boot loader on the corresponding storage.

2. The apparatus of claim 1, wherein the secondary memory has at least the same capacity as the main memory.

3. The apparatus of claim 1, further comprising:
   a network device that stores the boot loader, the kernel image, the RAM disk image, and the data mirrored onto the secondary memory on an external storage device.

4. The apparatus of claim 1, wherein when the main memory is abnormal, the boot loader, the kernel image, the RAM disk image, and the data that are mirrored onto the secondary memory are used.

5. The apparatus of claim 1, further comprising:
   a separate memory where the kernel image and the RAM disk image mounted in the main memory and the secondary memory are copied and extracted.

6. The apparatus of claim 5, wherein the separate memory is a volatile memory.

7. The apparatus of claim 1, wherein the main memory and the secondary memory are nonvolatile memories.

8. An apparatus for mirroring firmware and data of an embedded system, comprising:
   a main memory that includes storages for a boot loader, a kernel image, a RAM disk image, and data, and receives the boot loader, the kernel image, the RAM disk image, and the data to be stored on corresponding storages;
   a secondary memory that includes storages for the boot loader, the kernel image, the RAM disk image, and the data and
   a memory manager that mirrors the boot loader, the kernel image, the RAM disk image, and the data stored on the main memory into the secondary memory,
   wherein when the embedded system is turned on, the boot loader of a boot ROM is copied on a space for a boot loader of the main memory, and the boot loader is executed so that the kernel image and the RAM disk image are stored on the main memory through TFTP (Trivial File Transfer Protocol).

9. A method of mirroring firmware and data of an embedded system, comprising:
   copying a boot loader onto a main memory by executing a boot code of a boot ROM when the embedded system is turned on;
   storing a kernel image, a RAM disk image, and data stored on the main memory by executing the boot loader; and
   mirroring the boot loader, the kernel image, the RAM disk image, and the data stored on the main memory onto a secondary memory using a memory manager.

10. The method of claim 9, further comprising:
    copying the boot loader of the boot ROM onto the secondary memory when the embedded system is turned on and if the main memory is abnormal.

11. The method of claim 10, further comprising:
    storing the kernel image and the RAM disk image stored on the secondary memory on a kernel space and a RAM disk space of a separate memory from the main memory and the secondary memory, to extract to the separate memory a compressed image when the embedded system is turned on, if the main memory is abnormal.

12. The method of claim 9, further comprising:
    using the boot loader, the kernel image, the RAM disk image, and data mirrored onto the secondary memory when the main memory is abnormal.

13. The method of claim 9, further comprising:
    storing the mirrored boot loader, the kernel image, the RAM disk image, and the data of the secondary memory on an external storage device connected through a wire/wireless network.

* * * * *